(12) United States Patent
Choi et al.

(10) Patent No.: US 8,019,230 B2
(45) Date of Patent: Sep. 13, 2011

(54) METHOD FOR PROVIDING VISIBLE LIGHT COMMUNICATION IN A VISIBLE LIGHT COMMUNICATION SYSTEM

(75) Inventors: Jeong-Seok Choi, Yongin-si (KR); Dae-Kwang Jung, Suwon-si (KR); Yun-Je Oh, Yongin-si (KR); Hong-Seok Shin, Suwon-si (KR); Kyung-Woo Lee, Yongin-si (KR); Dong-Jae Shin, Seoul (KR); Sung-Bum Park, Suwon-si (KR); Yoo-Jeong Hyun, Seongnam-si (KR); Seong Hoon Hyun, legal representative, Sung Nam (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 644 days.

(21) Appl. No.: 12/220,591

(22) Filed: Jul. 25, 2008

(65) Prior Publication Data
US 2009/0028558 A1    Jan. 29, 2009

(30) Foreign Application Priority Data
Jul. 25, 2007   (KR) .......................... 10-2007-0074567

(51) Int. Cl.
*H04B 10/00* (2006.01)

(52) U.S. Cl. ........ 398/172; 398/135; 398/130; 398/127; 398/128; 398/118

(58) Field of Classification Search ................... 398/172, 398/135, 118, 119, 127, 130, 128, 136, 41, 398/158, 140, 164, 17, 33
See application file for complete search history.

(56) References Cited

U.S. PATENT DOCUMENTS

| 7,548,698 | B2 * | 6/2009 | Yamamoto | 398/172 |
| 7,912,377 | B2 * | 3/2011 | Koga | 398/172 |

* cited by examiner

*Primary Examiner* — Hanh Phan
(74) *Attorney, Agent, or Firm* — Cha & Reiter, LLC

(57) ABSTRACT

A method of providing a visible light communication in a data link layer of a visible light communication system adopting an infrared communication link connection protocol includes: broadcasting a discovery exchange station identification (D-XID) frame; generating a visible frame to provide a visibility to a link for a specified waiting time period for responding to the broadcast D-XID frame; exchanging a set normal response mode (SNRM) frame and an unnumbered acknowledgement (UA) frame for requesting a link setting between the transmitting and receiving terminals; generating visible frames for a waiting time for receiving the SNRM frame and the UA frame; exchanging an information transfer frame (I-frame) and a receive ready (RR) frame, which is a response to the I-frame, between the transmitting and receiving terminals; and generating visible frames for a specified waiting period for receiving the I-frame and the RR frame.

7 Claims, 8 Drawing Sheets

METHOD FOR PROVIDING VISIBLE LIGHT COMMUNICATION IN A VISIBLE LIGHT COMMUNICATION SYSTEM

CLAIM OF PRIORITY

This application claims priority to an application entitled "Method for Visible Light Communication in Visible Light Communication System" filed in the Korean Intellectual Property Office on Jul. 25, 2007 and assigned Serial No. 2007-74567, the contents of which are hereby incorporated by reference.

BACKGROUND OF THE INVENTION

1. Field of the Invention

The present invention relates to a visible light communication system, and more particularly to a method of performing more accurate communication by providing a visibility link while data is transmitted/received.

2. Description of the Related Art

FIG. 1 is a flowchart illustrating a data transferring process via an Infrared Data Association (IrDA) link access protocol (IrLAP) in a general infrared wireless communication system. As shown, the data transferring process in a data line layer typically includes activating an infrared communication (step 100), discovering external infrared communication devices (step 102), negotiating a communication method between the discovered terminals (step 104), transferring data (step 108) through a link connection between transmitting/receiving terminals (step 106) after the communication method is determined, disconnecting the link connection for the communication (step 110) when the data transfer is completed, and deactivating the infrared communication (step 112).

As described above, the data link layer of an infrared communication system, i.e. an IrLAP link connection protocol, regulates infrared media access rules and infrared communication standards related to the procedure for a communication method between transmitting/receiving terminals. The protocol may be classified into three processes: a discovery process for discovering external infrared communication devices, a connection setup process, and a disconnection process.

FIG. 2 is a signal flowchart illustrating the discovery process in the IrLAP of an infrared communication system.

Referring to FIG. 2, an initiator 210 performs communication repeats to broadcast a discovery exchange station identification (D-XID) frame (steps 214, 216, and 220), and confirms whether a discovery response XID (D-R-XID) frame, which is a response signal to the D-XID frame, is received in a standby state for a slot period. Here, the slot indicates a period during which a half duplex type bidirectional communication occurs, where data flows in one direction or the other, but not both at the same time. If the slot is terminated, the initiator 210 writes information on the communication through a discovery log process. This operation is performed whenever the initiator 210 performs a specified transmission/reception; thus, it can be determined whether a service application intends to perform the communication.

A responder 212 recognizes the D-XID frame received from the initiator 212 (step 222), and transmits a D-R-XID frame, which is a response frame to the D-XID frame, to the initiator if the responder wants the communication.

The initiator 210 receives the D-R-XKD frame from the responder 212 (step 224), prepares a discovery log, reports the existence of the responder to a service application, and then shifted to a connection setup mode.

FIG. 3 is a signal flowchart illustrating the connection setup process in the IrLAP of an infrared communication system.

Referring to FIG. 3, the initiator 210 in the discovery process becomes a primary device 310, and the responder 212 in the discovery process becomes a secondary device 312. The primary device 310 transmits a set normal responder mode (SNRM) frame (step 311), and the secondary device 312, which has received the SNRM frame, transmits a response to the SNRM frame through an unnumbered acknowledgement (UA) frame transmission (step 316). The primary device 310, after receiving the UA, transmits a receive ready (RR) frame (step 318), completes a parameter setting required for the communication, and is shifted to a normal response mode (NRM) in which the communication can be performed.

FIGS. 4 and 5 are signal flowcharts in a normal response mode after the connection setup process in the IrLAP of an infrared communication system.

Referring to FIG. 4, a primary device 410 transmits an I-frame (step 420), and a secondary device 412 transmits an RR frame (step 424) as a response to the received I-frame. Here, as illustrated in FIG. 5, if a link between the primary device 510 and the secondary device 512 is disconnected, the I-frame is not transmitted to the secondary device 512, and thus the primary device 510 cannot receive the RR frame. In this case, the primary device 510 repeatedly retransmits the I-frame for a predetermined time even though it fails to receive the RR frame that is the response to the I-frame. If the predetermined time elapses, the primary device is shifted to a normal disconnect mode (NDM) to terminate the link setting.

As illustrated in FIGS. 2 to 5, the IrLAP of the infrared communication system is a half duplex type data link layer, i.e. an asymmetric data link layer. Hence, in the data transmission mode, the visibility is restricted depending on the amount of data of the transmitter and receiver sides. Also, since the IrLAP is a protocol using infrared rays, the application of the IrLAP to a visible light communication (VLC) protocol for the visibility is limited.

Further, according to the conventional infrared communication, infrared rays are not transmitted until the communication link is established. Thus, there is no way for the user to know if the link is disconnected halfway in the discovery process of the infrared communication devices, in the link connection process between two devices after the discovering, or in the data transferring process between two devices.

Accordingly, there is a need for an improvement in a local wireless communication system using a visible light to solve above drawbacks.

SUMMARY OF THE INVENTION

The present invention has been designed to solve the above and other problems occurring in the prior art, and provides additional advantages, by providing a method of providing visibility to a link through application of an IrLAP protocol of an infrared communication system during data transmission/reception mode.

In accordance with an aspect of the present invention, a method for visible light communication in a data link layer of a visible light communication system adopting an infrared communication link connection protocol includes, in a discovery process of broadcasting a discovery exchange station identification (D-XID) frame in order for a transmitter side to discover a terminal with which the transmitter side intends to communicate, a receiver side, which is expected to communicate with the transmitter side, generating a visible frame to provide a visibility to a link for a waiting time for responding to the broadcast D-XID frame; in a connection process of identifying transmitting and receiving terminals to perform communication through the discovery process and exchanging a set normal response mode (SNRM) frame and an unnumbered acknowledgement (UA) frame for requesting a link setting between the transmitting and receiving terminals, the transmitting and receiving terminals generating visible frames for a waiting time for receiving the SNRM frame and the UA frame; and in a normal response mode (NRM) process of exchanging an information transfer frame (I-frame) and a receive ready (RR) frame, which is a response to the I-frame, between the transmitting and receiving terminals between which the link has been set through the connection process, the transmitting and receiving terminals generating visible frames for a waiting time for receiving the I-frame and the RR frame.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE INVENTION

Figure 1:
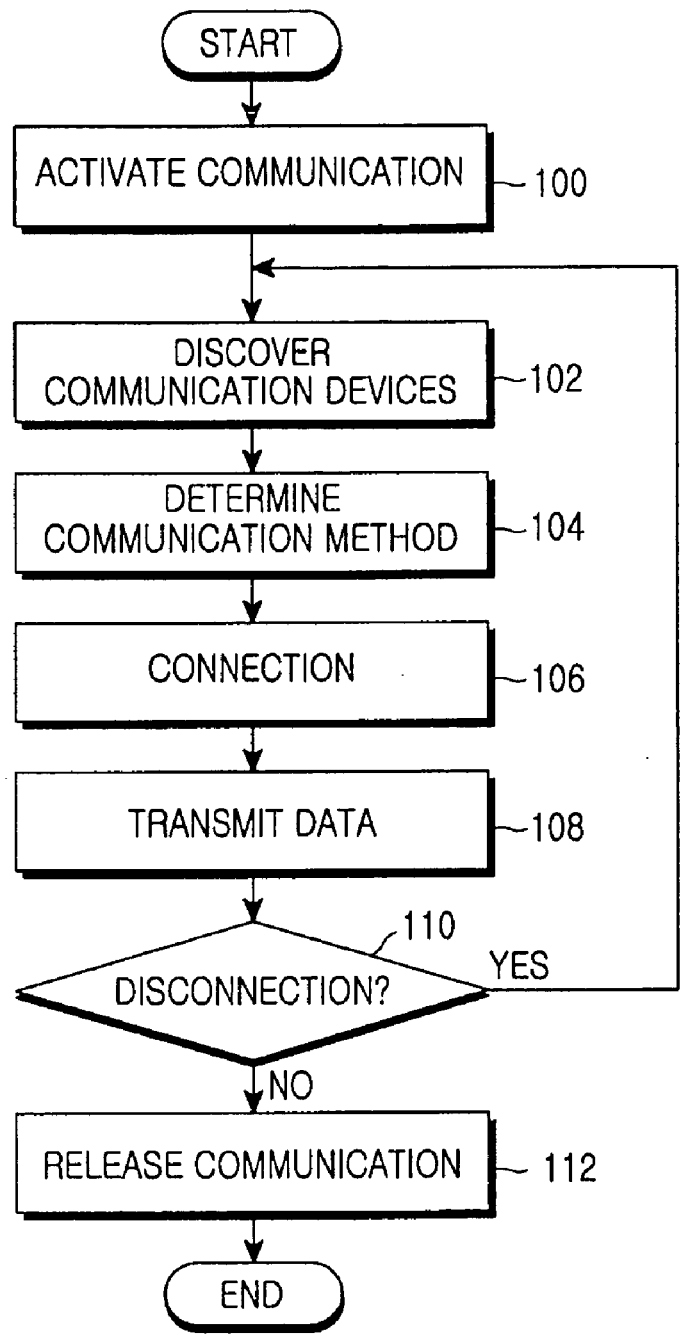
FIG. 1 illustrates a data transferring process through the Infrared Data Association (IrDA) link access protocol (IrLAP) of a general infrared wireless communication system.
Figure 2:
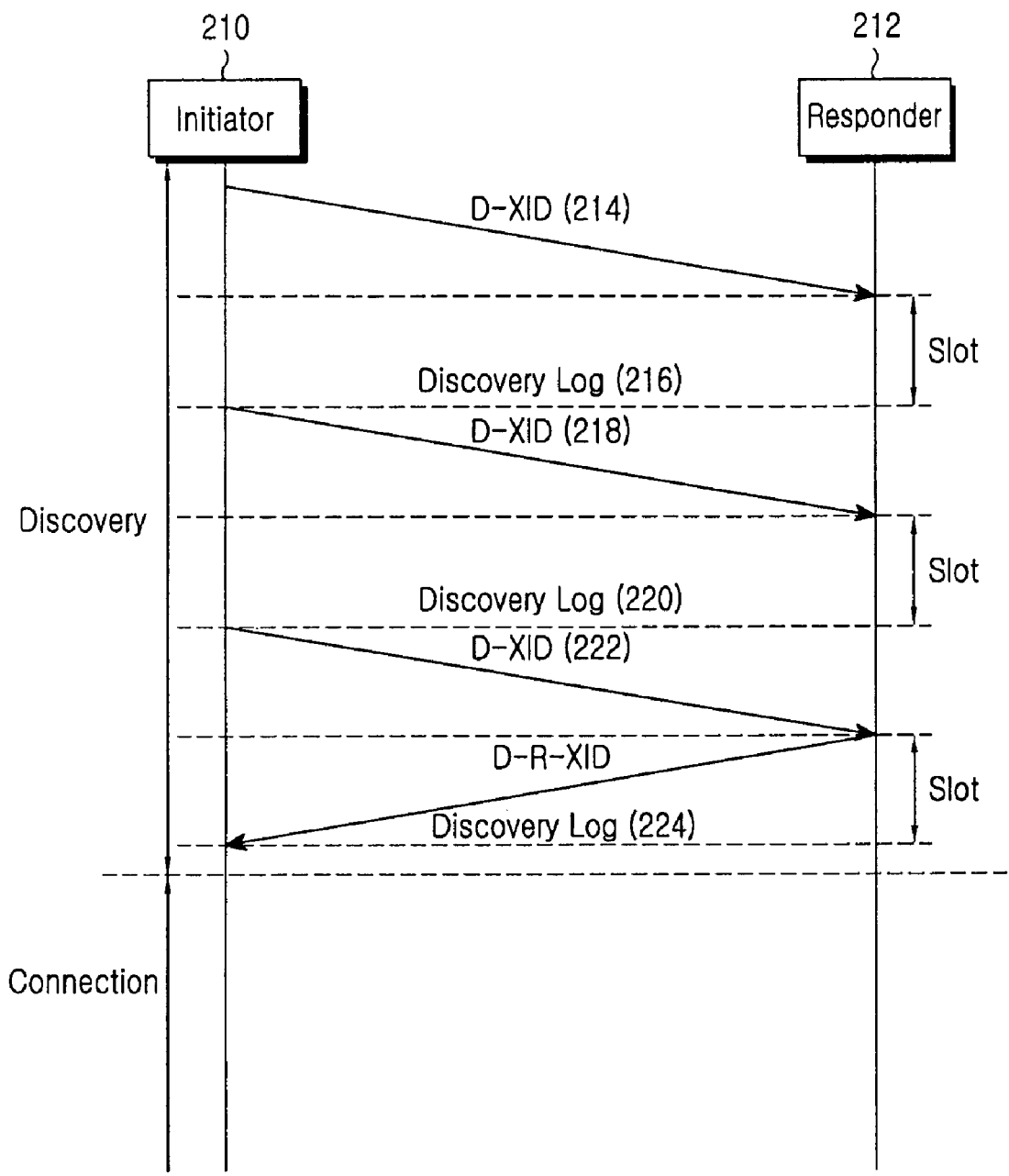
FIG. 2 illustrates a discovery process in the IrLAP of an infrared communication system.
Figure 3:
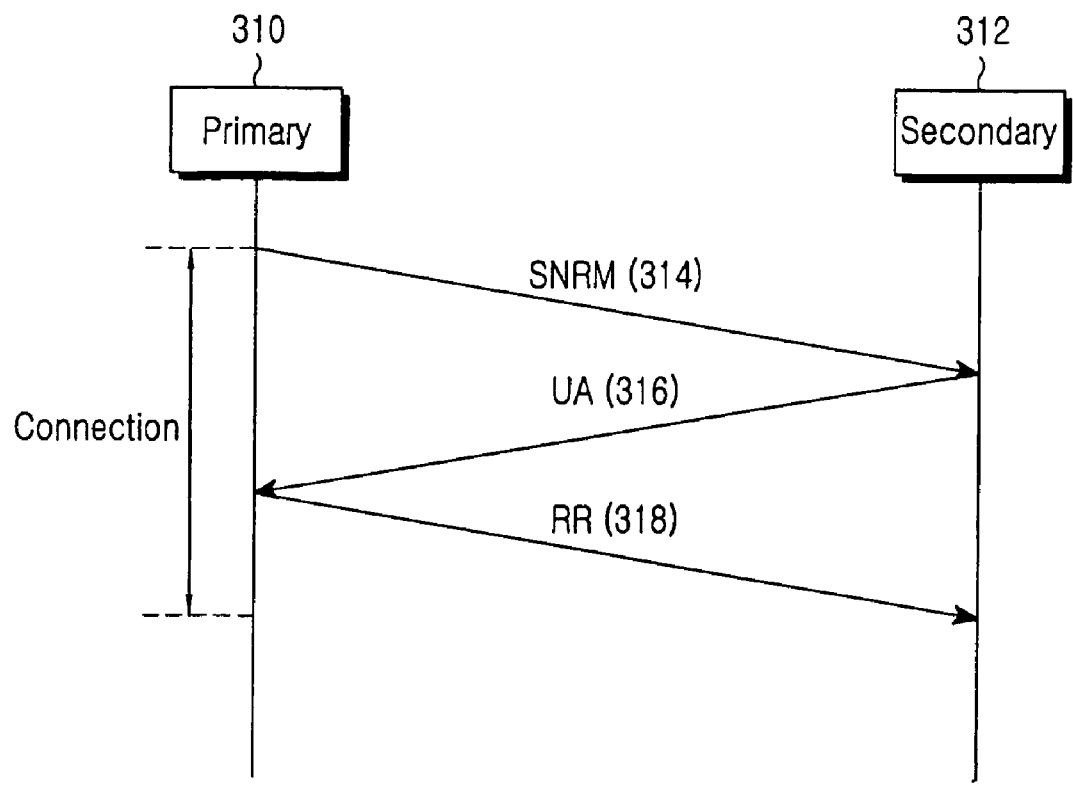
FIG. 3 illustrates a connection setup process in the IrLAP of an infrared communication system.
Figure 4:
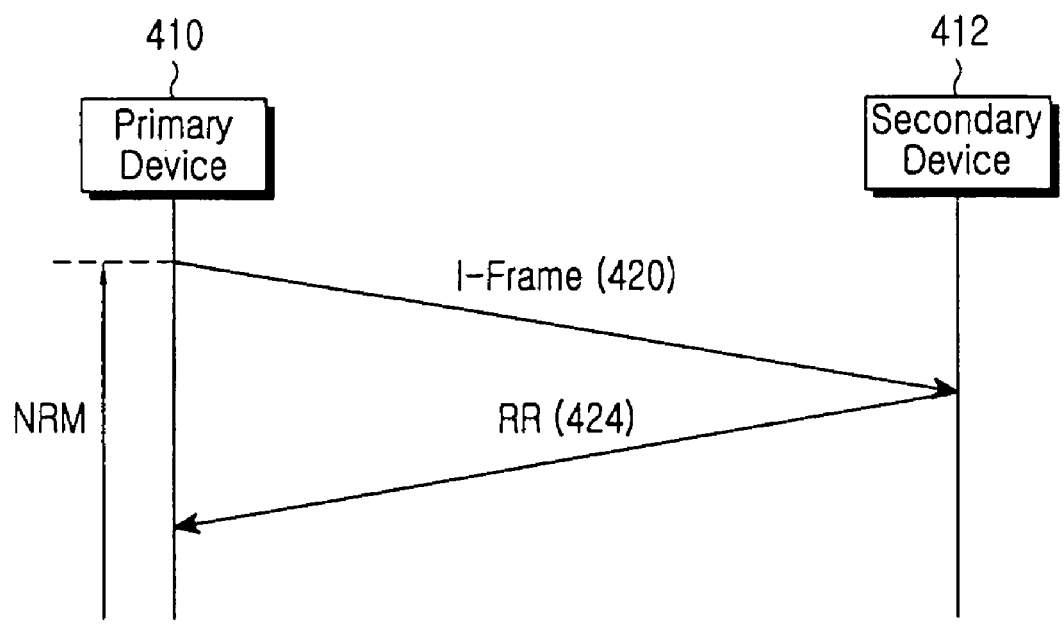
FIGS. 4 and 5 are signal flowcharts in a normal response mode after the connection setup process in the IrLAP of an infrared communication system.
Figure 5:
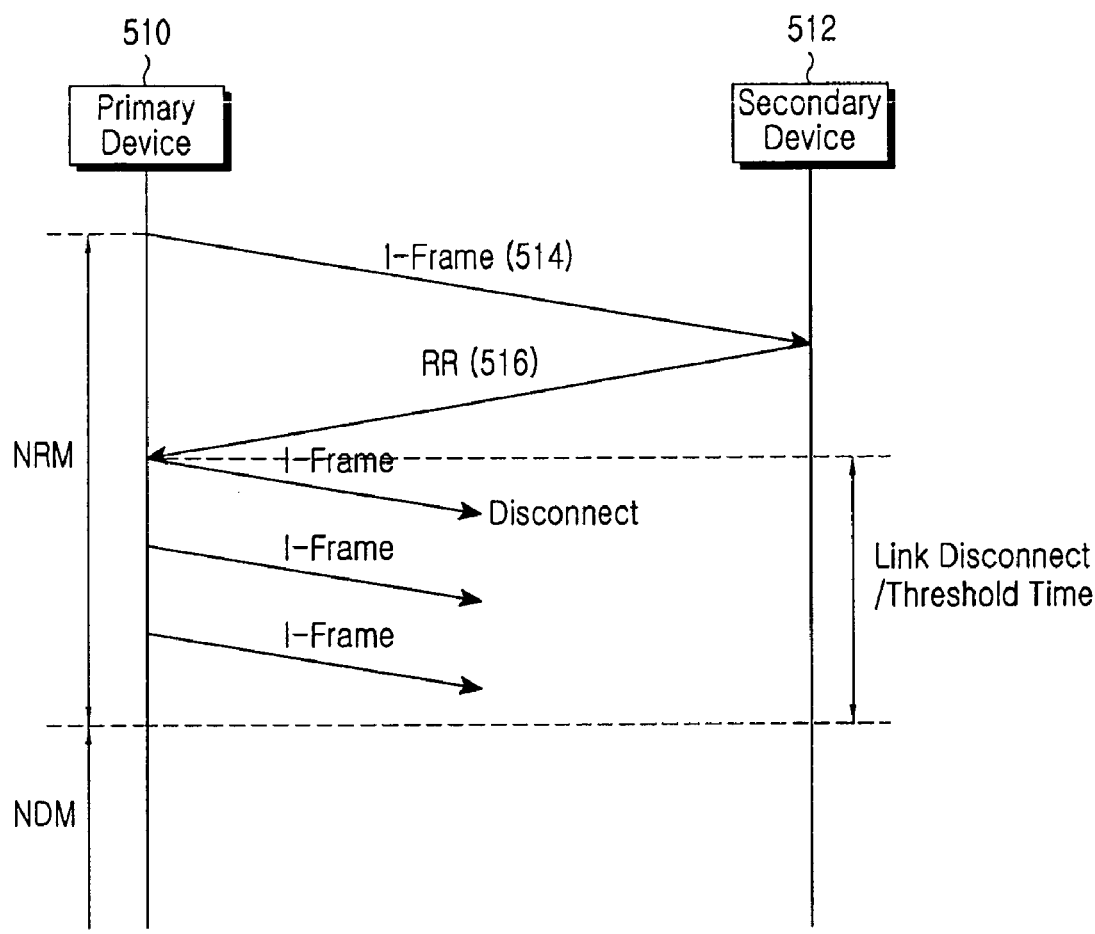

Now, embodiments of the present invention will be described in detail hereinafter with reference to the accompanying drawings. In the following description of the present invention, the same drawing reference numerals are used for the same elements even in different drawings. For the purposes of clarity and simplicity a detailed description of known functions and configurations incorporated herein will be omitted as it may obscure the subject matter of the present invention.

The teachings of the present invention are applicable to a visible light communication system, and more particularly, to a communication protocol which relates to the operations performed in a data link. The data link manages a data flow through a physical link in a network among open systems interconnection (OSI) 7 layers. Also, the visible light communication system according to the present invention is provided with visible light for transmitting and receiving devices, and provides the visibility to a link of the transmitting and receiving devices during transmission and reception modes. Note that the IrLAP link connection protocol mention in the specification is a protocol in a data link layer prescribed in the infrared wireless communication system. Since this protocol is well known in the field of infrared wireless communication, the detailed description of transmission control commands will be omitted.

Figure 6:
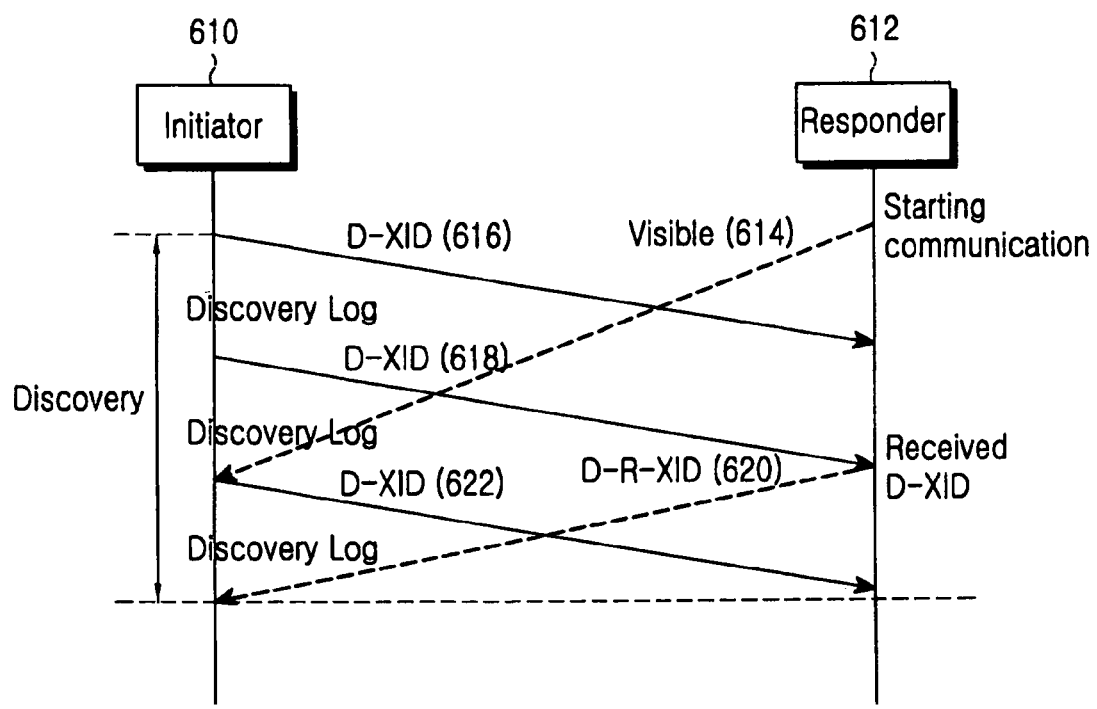
FIG. 6 illustrates in a discovery process in a data link layer of a visible light communication system adopting the IrLAP protocol according to an embodiment of the present invention.

FIG. 6 is a signal flowchart in a discovery process in a data link layer of a visible light communication system adopting the IrLAP protocol according to an embodiment of the present invention.

Referring to FIG. 6, a responder 612 outputs a visible frame at a desired time (step 614) to initiate a communication, and an initiator 610 which wants to perform the communication broadcasts a self discovery exchange station identification (D-XID) frame for a predetermined number of times (steps 616, 618, and 622). Note that visible signal is emitted by LED. Here, a full duplex type bidirectional communication, whereby data flows in both directions simultaneously, are performed between the initiator 610 and the responder 612. Accordingly, a slot, which is a transmission/reception standby state period, is not required.

Meanwhile, a responder 612 recognizes the D-XID frame received from the initiator 610, and transmits a D-R-XID frame, which is a response frame to the D-XID frame, to the initiator 610 if the responder 612 wants to establish a communication (step 620). The initiator 610 receives the D-R-XKD frame from the responder 612 (step 620), prepares a discovery log, reports the existence of the responder to the service application, then shifted to a connection setup mode.

Figure 7:
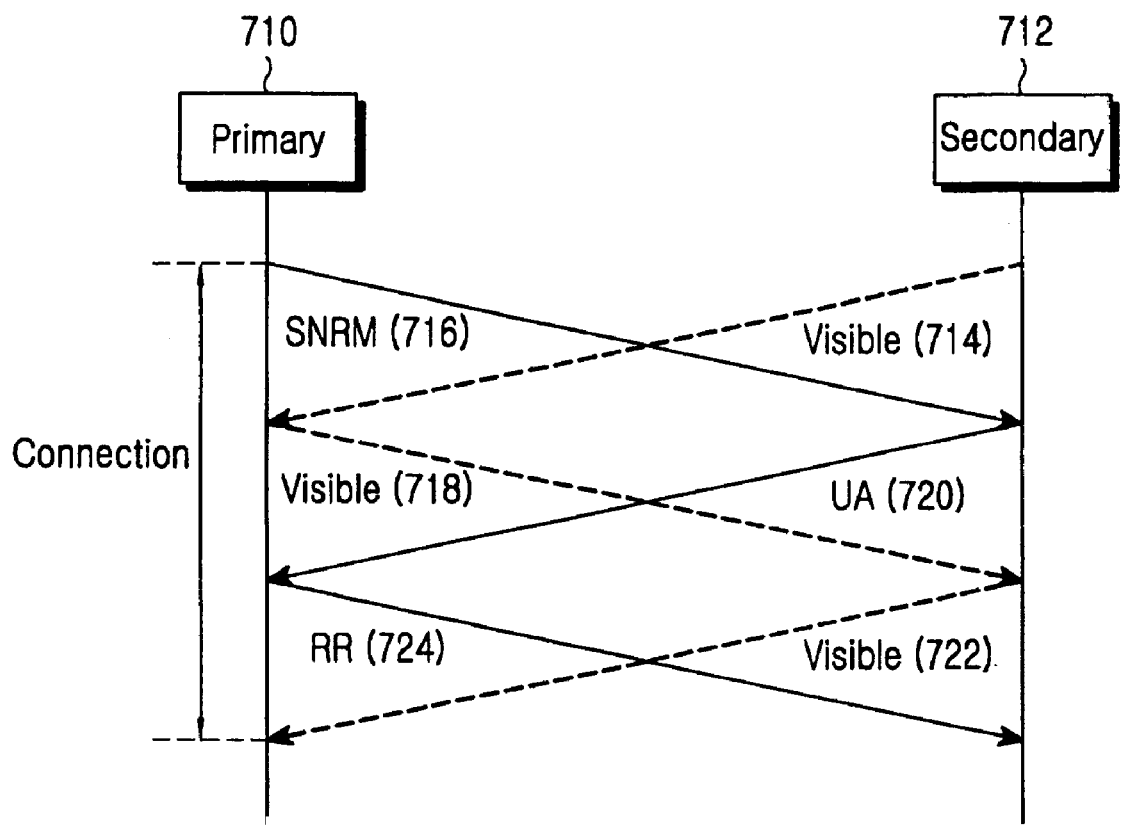
FIG. 7 illustrates a connection setup process in a data link layer of a visible light communication system adopting the IrLAP protocol according to an embodiment of the present invention.

FIG. 7 is a signal flowchart in a connection setup process in a data link layer of a visible light communication system adopting the IrLAP protocol according to an embodiment of the present invention.

Referring to FIG. 7, the initiator 610 in the discovery process becomes a primary device 710, and the responder 612 in the discovery process becomes a secondary device 712. The secondary device 712 transmits a visible frame to the primary device 710 (step 714) Note that visible frame is a visible light signal that serves to inform a user as to whether communication is being processed between two devices. As such, visible frame provides a visibility link. The primary device 710 transmits a set normal responder mode (SNRM) frame to the secondary frame 712 (step 716), and then transmits a visible frame in response to the visible frame received from the secondary device 712 (step 718). This is a process for the primary device 710 to give the visibility of the link for a specified time before the primary device 710 transmits the SNRM frame to the secondary device 712 in the connection setup process. The secondary device 712, which has received the visible frame, transmits a corresponding visible frame in response to the received visible frame (step 722).

Then, the secondary device 712, which has received the SNRM frame, responds to the SNRM frame through an unnumbered acknowledgement (UA) frame transmission that is a response to an unnumbered command (step 720).

The primary device 710, after receiving the UA, transmits a receive ready (RR) frame (step 724), completes a parameter setting required for the communication, and is shifted to a normal response mode (NRM) in which the communication can be performed.

Figure 8:
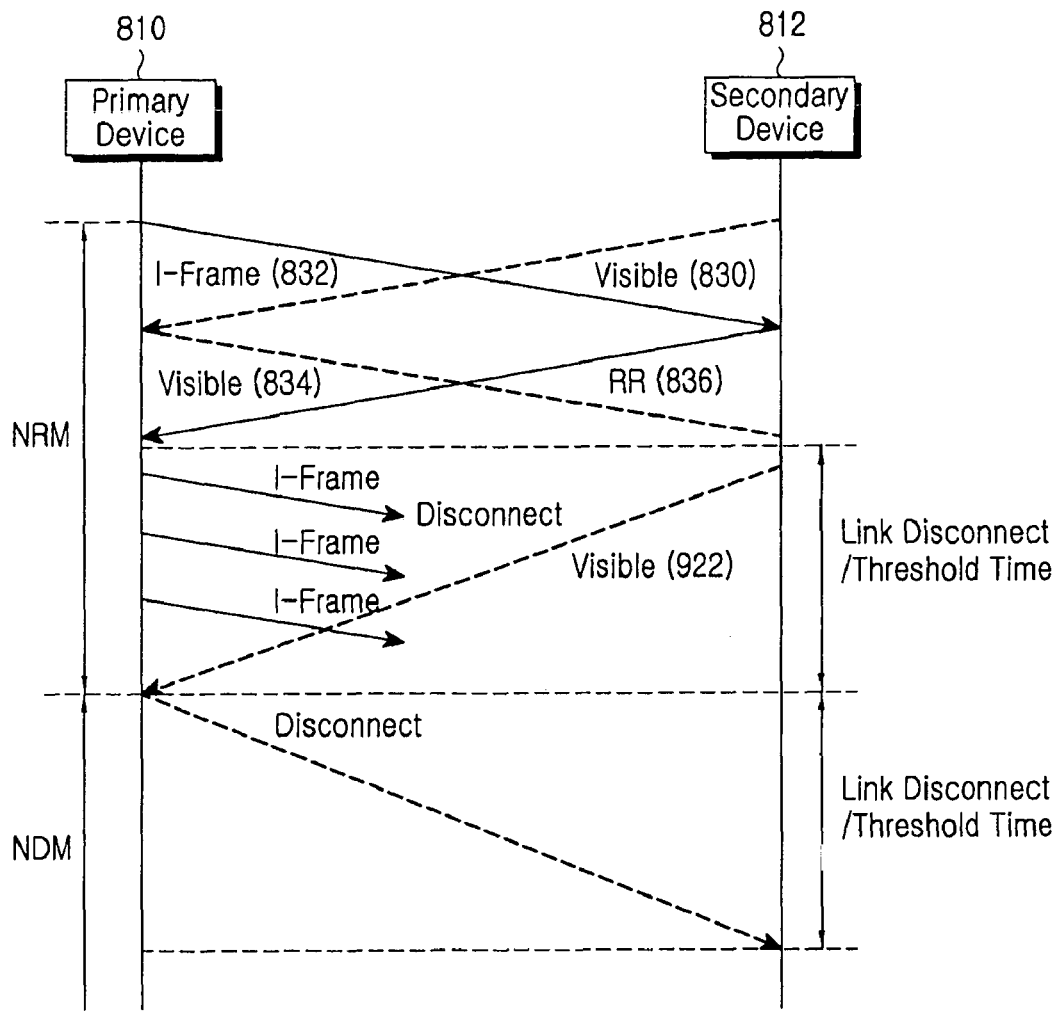
FIG. 8 illustrates an NRM process in a data link layer of a visible light communication system adopting the IrLAP protocol according to an embodiment of the present invention.

FIG. 8 is a signal flowchart in a normal response mode (NRM) process in a data link layer of a visible light communication system adopting the IrLAP protocol according to an embodiment of the present invention.

Referring to FIG. 8, the secondary device 812 generates and transmits a visible frame before receiving an information (I) frame from the link-connected primary device 810 (step 830), and the primary device 810 transmits the I-frame for the communication with the secondary device 812 (step 832). Then, in response to the visible frame received from the secondary device 812, the primary device 810 also transmits a visible frame to the secondary device 810 (step 834).

The secondary device 812 transmits the receive ready (RR) frame (step 836) as a response to the received I-frame (step 836). Note that information I-frame contains information on data to be transmitted. The above-described steps 830 to 836 are repeatedly performed until the last frame of information data comprised a plurality of frames is received.

The primary device 810 transmits an I-frame and waits for a predetermined time period, and the primary device 810 continues to wait until an RR frame s received. In case where the number of the I-frame transmissions and the waiting period exceeds a threshold time, the primary device 810 determines that the link between the primary device 810 and the secondary device 812 is disconnected. The secondary device 812 waits for a predetermined time period after receiving the I-frame. When a subsequent I-frame is not received until the predetermined time period, the secondary device 812 determines the link between the primary device 810 and the secondary device 812 is disconnected and transmits the visible frame to the primary device 810 (as seen in Step 922.). As such, after the primary device 810 and the secondary device 812 confirms the disconnection of a link, they terminates the link connection, then transmit to an NDM (normal disconnect mode).

As described above, according to the present invention, in transmitting/receiving data in a visible light communication system, a user can visually confirm a generated visible signal in real time. Further, according to the present invention, the communication security can be confirmed visually. That is, the user can easily grasp the position of the transmitting and receiving ends, and can confirm the communication path with his/her eyes. Accordingly, the user can open the communication path between the transmitting and receiving ends as he/she directly confirms the path with his/her eyes.

While the present invention has been shown and described with reference to certain exemplary embodiments thereof, it will be understood by those skilled in the art that various changes in form and details may be made therein without departing from the spirit and scope of the present invention as defined by the appended claims.

What is claimed is:

1. A method for providing a visible light communication in a data link layer of a visible light communication system adopting an infrared communication link connection protocol, the method comprising:

broadcasting during a discovery process, by a transmitting terminal, a discovery exchange station identification (D-XID) frame to establish a communication link;

generating, by a receiving terminal, a visible frame to provide a visibility to the link for a predetermined waiting time period for responding to the broadcast D-XID frame;

exchanging during a connection process a set normal response mode (SNRM) frame and an unnumbered acknowledgement (UA) frame for requesting a link setting between the transmitting and receiving terminals and generating visible frames for the predetermined waiting period for receiving the SNRM frame and the UA frame; and exchanging during a normal response mode (NRM) an information transfer frame (I-frame) and a receive ready (RR) frame in response to the I-frame, between the transmitting and receiving terminals, when the link has been established and generating visible frames for the predetermined waiting period for receiving the I-frame and the RR frame.

2. The method as claimed in claim 1, wherein, in the NRM process, if the corresponding RR frame of the I-frame is not received for a predefined period after the transmitter terminal transmits the I-frame, the corresponding I-frame is repeatedly retransmitted until the RR frame is received.

3. The method as claimed in claim 1, wherein, in the NRM process, the visible frame is continuously generated after an expiration of the predetermined waiting period.

4. The method as claimed in claim 1, wherein, in the NRM process, if a disconnection of the link occurs during transmission of a specified I-frame, and the disconnected link is not restored for a predefined time period, the corresponding link connection is terminated, and the discovery process is repeated.

5. The method as claimed in claim 1, wherein data transmission and reception between the transmitting and receiving terminals are performed through a full duplex type bidirectional communication, whereby the data transmission and reception are simultaneously performed in both directions.

6. The method as claimed in claim 1, wherein the visible frame is generated to confirm whether a communication channel has been prepared while the response frame corresponding to the received frame is generated.

7. The method as claimed in claim 1, wherein, in the NRM process, if a disconnection of the link occurs while the receiver side transmits the RR frame, the transmitter terminal provides the visibility of the communication link by generating the visible frame until the RR frame is received.

\* \* \* \* \*